(12) United States Patent
Dien

(10) Patent No.: US 9,973,130 B2
(45) Date of Patent: May 15, 2018

(54) METHOD FOR DRIVING AN AC MOTOR BY TWO-PHASE ELECTRIC POWER AND POWER GENERATION METHOD

(71) Applicant: Ghing-Hsin Dien, Taipei (TW)

(72) Inventor: Ghing-Hsin Dien, Taipei (TW)

( * ) Notice: Subject to any disclaimer, the term of this patent is extended or adjusted under 35 U.S.C. 154(b) by 0 days. days.

(21) Appl. No.: 15/434,532

(22) Filed: Feb. 16, 2017

(65) Prior Publication Data

US 2017/0237378 A1   Aug. 17, 2017

(30) Foreign Application Priority Data

Feb. 17, 2016 (TW) .............................. 105104653 A

(51) Int. Cl.
*H02P 25/098* (2016.01)
*H02P 6/10* (2006.01)
*H02P 27/00* (2006.01)
*H02M 7/5387* (2007.01)

(52) U.S. Cl.
CPC .......... *H02P 27/00* (2013.01); *H02M 7/5387* (2013.01); *H02P 6/10* (2013.01)

(58) Field of Classification Search
CPC ........... H02P 23/04; H02P 25/098; H02P 6/10
USPC ....................................... 318/432, 433, 448
See application file for complete search history.

(56) References Cited

U.S. PATENT DOCUMENTS

| 5,038,092 | A | * | 8/1991 | Asano | H02M 7/53875 |
| | | | | | 318/799 |
| 5,184,057 | A | * | 2/1993 | Sakai | H02M 5/4585 |
| | | | | | 318/801 |
| 5,420,782 | A | | 5/1995 | Luce et al. | |
| 5,672,944 | A | * | 9/1997 | Gokhale | H02P 6/10 |
| | | | | | 318/400.23 |
| 6,828,752 | B2 | * | 12/2004 | Nakatsugawa | H02P 6/10 |
| | | | | | 318/727 |
| 8,456,128 | B2 | * | 6/2013 | Fotherby | H02M 7/48 |
| | | | | | 318/106 |

FOREIGN PATENT DOCUMENTS

| CN | 104579043 A | 4/2015 |
| JP | 10042598 | 2/1998 |

* cited by examiner

*Primary Examiner* — Bentsu Ro
(74) *Attorney, Agent, or Firm* — Muncy, Geissler, Olds & Lowe, P.C.

(57) ABSTRACT

A method for driving an AC motor is disclosed. The method comprises generating two phases of currents to drive the motor coils to generate one magnetic field sum, and each positive and negative half output cycle of each phase of current has a positive or negative curved-triangle current. A method for generating electric power with an AC motor generator is also disclosed.

10 Claims, 12 Drawing Sheets

METHOD FOR DRIVING AN AC MOTOR BY TWO-PHASE ELECTRIC POWER AND POWER GENERATION METHOD

CROSS REFERENCE TO RELATED APPLICATIONS

This Non-provisional application claims priority under 35 U.S.C. § 119(a) on Patent Application No(s). 105104653 filed in Taiwan, Republic of China on Feb. 17, 2016, the entire contents of which are hereby incorporated by reference.

BACKGROUND OF THE INVENTION

Field of Invention

The present invention relates to a method for driving an AC motor and a power generation method, especially about using two-phase alternating currents to drive an AC motor and using the motor to generate power.

Related Art

Most conventional motors use multiphase currents to drive coils of the stator, so as to generate a rotating magnetic field inside the motor to drive the rotor to rotate. According to different types and requirements of motors, the multiphase currents could be square-wave currents or sine-wave currents. Brushless DC motors (BLDCM) usually use square-wave currents to drive, while permanent magnet synchronous motors (PMSM) or AC-induction motors usually use sine-wave currents to drive. Square-wave (or trapezoidal-wave) current driver generates larger magnetic field ripples but has a relatively simple driver circuit. Sine-wave current driver generates smaller magnetic field ripples so the motor has a smoother rotation and lower noise, and so sine-wave drivers are used in many applications with higher requirements.

For example, in a three-phase sine-wave driven permanent magnet synchronous motor, the three-phase sine-wave currents, with a 120-degree phase difference to each other, drive three sets of coils of the motor and generate three sets of magnetic fields (vectors) to combine into one set of rotating magnetic field sum (vector sum). The rotor then rotates with the combined magnetic field sum (vector sum). But this kind of three-phase sine-wave driving method implicitly generates some invalid and useless magnetic fields (vectors) that are reverse to the direction of rotation and cancel with other magnetic fields (vectors), which results in the waste of power.

On the other hand, a typical conventional two-phase motor uses two sine-wave currents with 90-degree phase difference to drive a four-pole stator (i.e. with four sets of stator teeth and coils, or with 90-degree stator pole pitch) to generate a substantially no-ripple (or with the smallest ripple) and steadily rotating magnetic field for its rotor. Due to the characteristics of the two-phase sine-wave currents, the two-phase motor must have four stator poles or the stator pole pitch must equal to 90 degrees if a substantially no-ripple (or smallest-ripple) rotating magnetic field sum is required. And, if a two-phase four-stator-pole motor wants to generate the same torque (or the same rotating magnetic field strength) as a three-phase six-stator-pole motor with sine-wave currents, it requires 1.5 times of power than that for the three-phase six-stator-pole motor. Such low efficiency nature has limited the application of the two-phase motors.

Therefore, if we can design a method of driving a motor with multiphase alternating currents and without generating any invalid magnetic fields (vectors), and still keep the same rotating magnetic field sum (vector sum), then we can lower the power consumption of a motor. Furthermore, if we can design a method to drive a two-phase motor with more than four stator poles or with a stator pole pitch smaller than 90 degrees, and generating substantially no magnetic field ripples, and also with lesser driving power, then we can greatly expand the applications of two-phase motors and use them to replace the three-phase motors with lower cost.

SUMMARY OF THE INVENTION

To achieve the above subject, an objective of the present invention is to provide a method for driving a two-phase or multiphase AC motor with alternating currents to reduce the invalid magnetic fields in the conventional motor, lower the power consumption, and create a steady and substantially no-ripple (or smallest-ripple) rotating magnetic field to drive the rotor to rotate or move. It is also an objective to provide a substantially no-ripple (or smallest-ripple) drive method for a two-phase motor with more than four stator poles or with a stator pole pitch smaller than 90 degrees. To make it easier to understand, it is preferred to assume the motors in the following descriptions use concentrated windings.

Another objective of the invention is to provide a motor generator to generate power with two-phase currents and with higher efficiency.

The invention discloses a method for driving an AC motor using two-phase alternating currents. A controller with software or hardware or software/hardware techniques is used to generate at least two alternating currents with different phases to drive the AC motor. The AC motor has a rotor, a stator and at least two sets of stator coils, and the stator generates a plurality of stator poles when the stator coils are energized. The angular distance between two adjacent stator poles is smaller than 90 degrees. The method comprising: driving the two sets of stator coils by the two alternating currents with different phases and generate two sets of magnetic fields which combine into one set of magnetic field sum so as to drive the rotor. The magnetic field sum substantially has no ripples and its change rate of rotation angle or movement is proportional to the change rate of the phase angle of the two alternating currents, and each cycle of each of the two alternating currents has a positive half cycle and a negative half cycle. The positive half cycle comprises a positive curved-triangle current waveform, and the negative half cycle comprises a negative curved-triangle current waveform. The phrase "substantially has no ripples" represents that with theoretical ideal values it can be completely ripple free, and the said positive or negative curved-triangle current represents a current waveform wherein the rising slope and falling slope falls between a sine-wave waveform and a triangle-wave waveform of the same peak point. When the controller generates a multiphase output, at any time only two phases of the multiphase output provides currents to the motor.

The invention further discloses a method for driving an AC motor which uses a controller with software or hardware or software/hardware techniques to generate at least two alternating currents with different phases to drive the AC motor. The AC motor has a rotor, a stator and at least two sets of stator coils. The stator generates a plurality stator poles when the stator coils are energized, and the angular distance between two adjacent stator poles is smaller than 90 degrees. The method comprising: driving the two sets of stator coils with the two alternating currents with different phases to generate two sets of magnetic fields which combine into one set of magnetic field sum so as to drive the rotor. The magnetic field sum substantially has no ripples and its change rate of rotation angle or movement is proportional to the change rate of the phase angle of the two alternating currents. Each of the two alternating currents has a reference current value A and B respectively, and the reference current values A and B are calculated by the following equations:

$$B = R \sin \alpha / \sin \theta,$$

$$A = R \cos \alpha - R \sin \alpha \cos \theta / \sin \theta,$$

wherein $\alpha$ represents the included angle between the magnetic field sum and the stator pole direction, $\theta$ represents the angular distance between two adjacent stator poles, R represents the magnetic field sum's strength, and $\theta$ is smaller than 90 degrees.

The invention further discloses a method for generating electric power with an AC motor generator. The AC motor generator has a rotor, a stator and two sets of stator coils. The rotor generates at least one set of rotating magnetic fields when the rotor rotates, and each set of the rotating magnetic fields drives the two sets of the stator coils, and generates two phases of induction currents with 90 degrees of phase difference in the two sets of stator coils. The angular distance between two adjacent stator poles is less than 90 degrees. At any time point, $\alpha$ is the included angle between the rotating magnetic field and the stator pole direction, $\theta$ is the angular distance between two adjacent stator poles, and R is the strength of a rotating magnetic field. Each of the two induction currents has a reference current value A and B respectively, and reference current values A and B are calculated by the following the equations:

$$B = R \sin \alpha / \sin \theta,$$

$$A = R \cos \alpha - R \sin \alpha \cos \theta / \sin \theta, \text{ wherein } \theta \text{ is smaller than 90 degrees.}$$

In an embodiment of the invention discloses a two-phase AC drive method for a motor, which applies two phases of currents to drive the motor coils and generate two sets of magnetic fields (vectors), and the two sets of magnetic fields (vectors) are combined into one set of magnetic field sum (vector sum) that rotates steadily and substantially has no ripples (or has the smallest ripples), and the rotating magnetic field sum drives the rotor to rotate, so the anti-rotation magnetic field vectors (vectors that are opposite to the direction of rotation) or the invalid vectors that cancels each other in a three-phase system are not generated, so as to save the power.

In an embodiment of the invention discloses a two-phase or multiphase motor drive method that drives a motor which has more than four stator poles or has a stator pole pitch which is smaller than 90 degrees. A control circuit controls two-phase currents to drive the motor stator coils, and three parameters are used for calculating current values. The first parameter is the included angle between the rotating magnetic field sum and the stator pole direction, the second parameter is the angular distance between two adjacent stator poles, and the third parameter is the target strength of the rotating magnetic field. Three parameters are applied to the equations of the invention to calculate each phase current's value at any time point of the rotation, and the calculated current values are used to drive the motor to generate a substantially no-ripple (or smallest-ripple) and steadily rotating magnetic field for the rotor. To control the rotation of the motor, the control circuit uses real-time calculation or lookup tables or other software or hardware techniques with the equations to get the respective reference current values for any rotating position, so as to drive the motor based on the respective reference current values to get a substantially rippleless rotation.

In an embodiment of the invention discloses a power generation method for an AC motor generator to generate two-phase currents. The rotor of the AC motor generator generates at least one set of rotating magnetic field when the rotor rotates. Each set of the rotating magnetic field drives at most two sets of stator coils at one time, and generates two curved-triangle induction currents with 90 degrees in phase difference in those two sets of stator coils with higher efficiency.

As mentioned above, the invention uses two-phase currents with specially designed waveforms to drive motors without generating invalid magnetic fields which is usually generated in conventional multiphase sine-wave driven motors, so as to save power. Also, the invention provides a driving method for two-phase AC motors with more than four stator poles or with a stator pole pitch of smaller than 90 degrees to generate substantially ripple free rotation, so as to save power. Therefore, the invention can expand the applications of the two-phase motors. Furthermore, the same principle can be used reversely to generate power. When the motor is used as a motor generator, each rotating magnetic field generated by the rotating rotor of the motor generator drives at most two sets of stator coils at one time, and generates two curved-triangle currents. Accordingly, the magnetic flux can be used to generate power more efficiently.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references refer to the same elements.

The following descriptions are all based on concentrated winding AC motors. Basically each stator tooth generates one stator pole, but it is not to limit the invention to concentrated winding motors. The drive method of the invention still can be used with distributed winding motors.

Figure 1A:
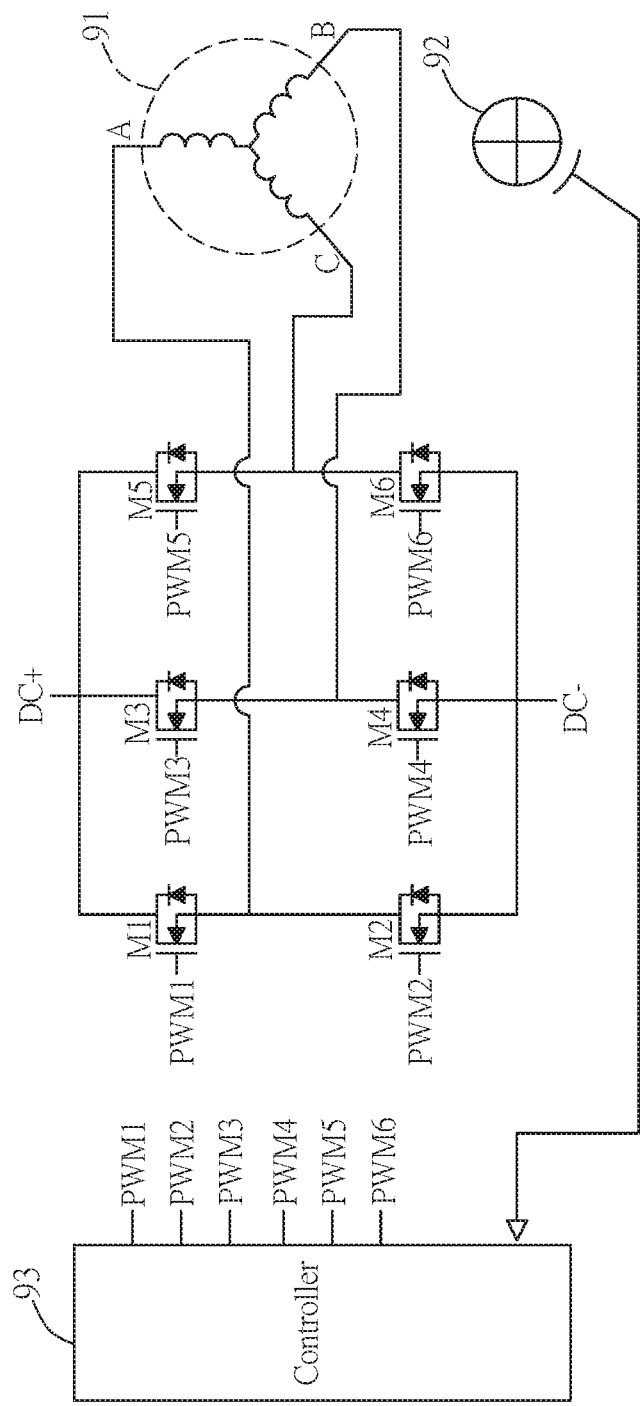
FIG. 1A is a circuit diagram of a conventional three-phase motor driver.

FIG. 1A is a circuit diagram of a conventional three-phase motor driver, the driver uses controller 93 to output Pulse Width modulation (PWM) signals (PWM1~PWM6) to control six (6) transistor switches (M1~M6) to generate three-phase sine-wave currents (phase A, phase B and phase C) to drive the motor 91 to rotate, and uses position detector 92 to detect the rotor position of motor 91 and generates a position signal feedback to controller 93.

Figure 1B:
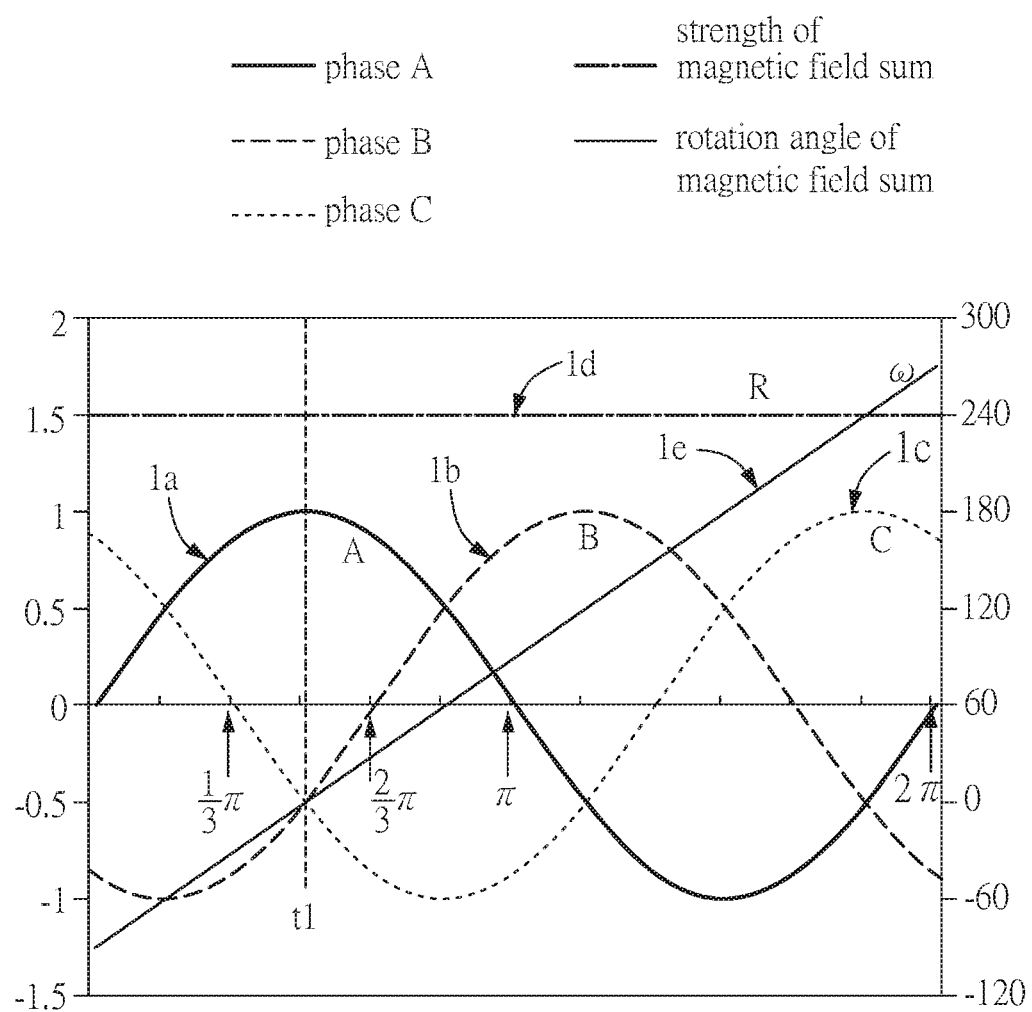
FIG. 1B is a schematic diagram that depicts a three-phase sine-wave current waveform for driving a conventional three-phase motor.
Figure 1C:
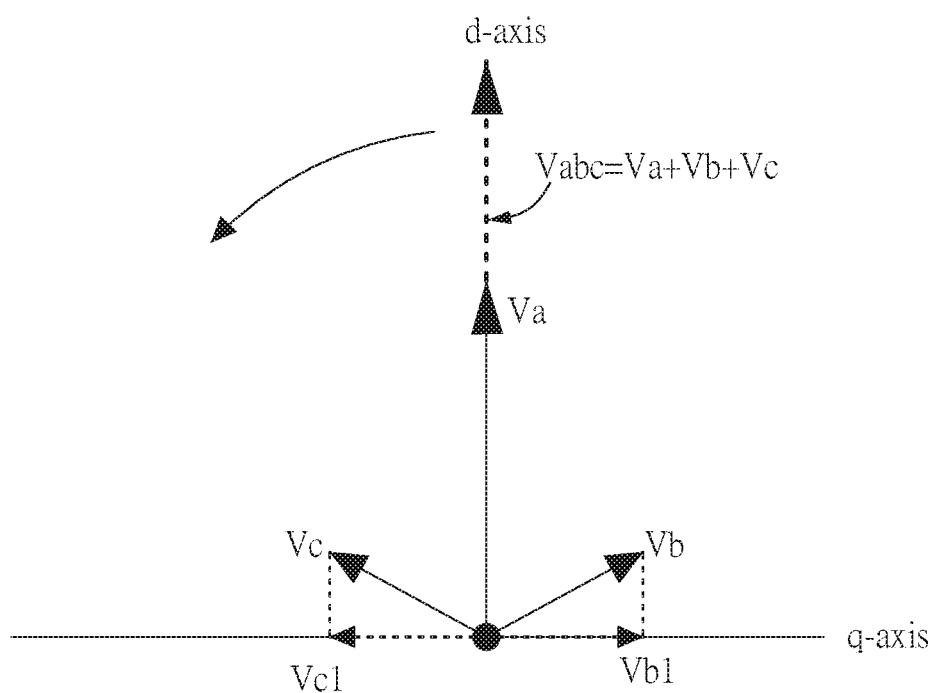
FIG. 1C is a vector diagram showing the three-phase magnetic field vector sum and its components of a three-phase sine-wave currents for a conventional motor.

Referring to FIG. 1B and FIG. 1C, the waveforms of a conventional three-phase sine-wave currents for a motor is shown in FIG. 1B. Please note that the strength of the magnetic field sum R equals 1.5 all the time (with no ripples). FIG. 1C shows the magnetic field vectors generated by the three-phase sine-wave currents in FIG. 1B at the time t1.

In FIG. 1B, at time t1 the three-phase currents A, B and C generate the three magnetic field vectors Va, Vb and Vc of FIG. 1C respectively. For example, in a six-stator-pole motor, the included angle of the three vectors is 120 degrees. At time t1 the Va has its maximum value, and Vb and Vc are negative. Vabc is the magnetic field vector sum of Va, Vb and Vc, and Vabc rotates counterclockwise. In FIG. 1C, the q-axis represents the axis perpendicular to the direction of the magnetic field vector sum Vabc, and d-axis represents the axis parallel to the direction of the vector sum Vabc. FIG. 1C shows that at time t1. Vb has a component Vb1 (points to the right) on the q-axis, and Vc also has a component Vc1 (points to the left) on the q-axis. The direction of Vb1 is opposite to the rotation. Therefore, Vb1 and Vc1 cancel each other, so they are basically invalid magnetic field vectors, and the currents used to generate Vb1 and Vc1 are basically wasted, which causes excessive power consumption and redundant, useless and invalid magnetic fluxes.

Conventional method to drive a motor with no torque ripples and high efficiency would be to use a 3-phase sine-wave current to drive a three-phase motor, but three-phase sine-wave currents generate three current vectors in the motor with two invalid vector components at the q-axis that cancels each other. The method of the present embodiment can eliminate those invalid vector components and can improve the motor efficiency for up to 30%. For instance, three-phase currents A, B and C generate three current vectors Va, Vb and Vc which are combined into a vector sum Vabc. Va is at the center. Vb and Vc each respectively has a component vector Vb1 and Vc1 at the q-axis with opposite directions. Vb1 and Vc1 cancels each other, which means that Vb1 and Vc1 are invalid vectors and their power is wasted. To eliminate the vector cancellation, the method of the present embodiment uses only two curved-triangle currents to drive the AC motor. In a multiphase system, two phases out of multiphase are used. Or, in a two-phase system, two curved-triangle currents are used to drive the motor, providing the same no-ripple rotation with higher efficiency. The two curved-triangle currents are calculated from two equations of the embodiment. The total power consumption compared to a conventional three-phase sine-wave system is improved by 30% (with a motor of 30-degree stator pole pitch).

Figure 2A:
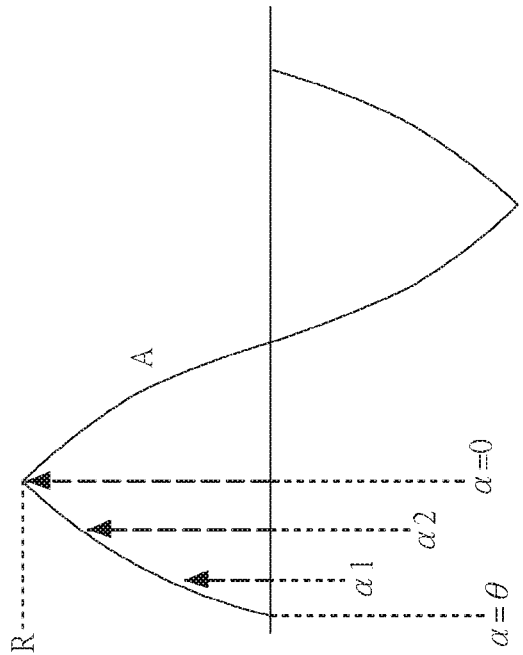
FIGS. 2A to 2E show the magnetic field vector sum and its components and the equation elements for calculating the two-phase currents of the invention.
Figure 2B:
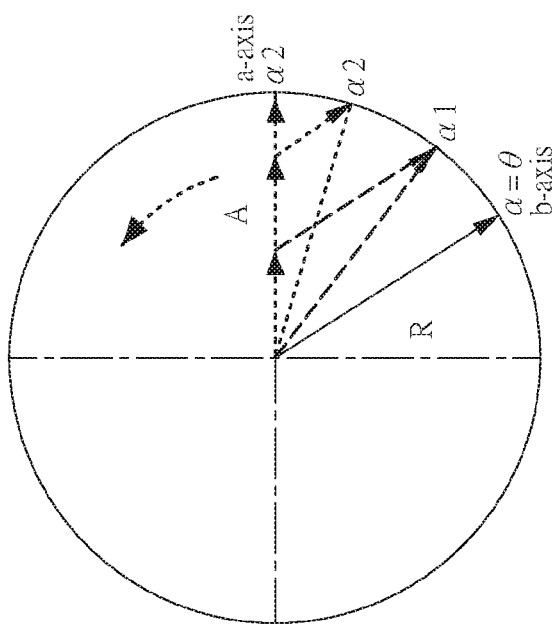
Figure 2C:
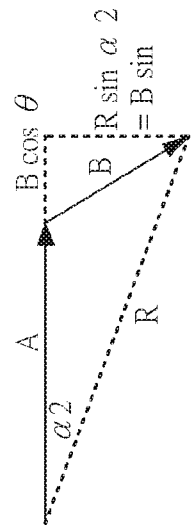
Figure 2D:
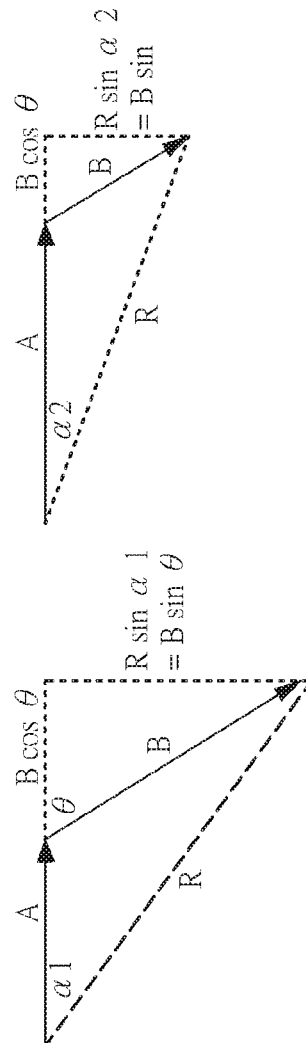
Figure 2E:
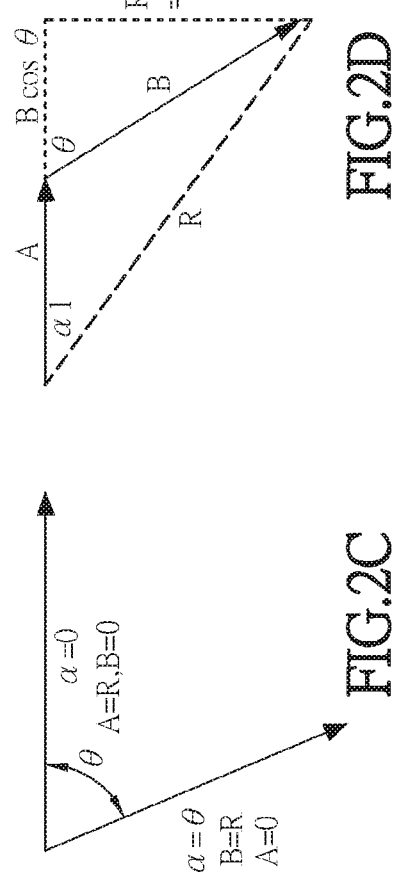

To eliminate the aforementioned vector cancellations in the conventional three-phase sine-wave drive method, a substantially two-phase (out of a multiphase) drive method is proposed. FIGS. 2A~3E shows how the invention uses two magnetic field vectors ($\vec{A}$ and $\vec{B}$) to combine into one magnetic field vector sum ($\vec{R}$). FIG. 2A shows the contour circle of the magnetic field vector sum $\vec{R}$ that rotates counterclockwise, vector sum $\vec{R}$ is the sum of (magnetic) vector $\vec{A}$ and (magnetic) vector $\vec{B}$. Vector $\vec{A}$ along the a-axis represents the magnetic flux vector generated from the A-phase current driving the A-phase stator tooth. Vector $\vec{B}$ along the b-axis represents the magnetic flux vector generated from the B-phase current driving the B-phase stator tooth. θ is the included angle between the two magnetic pole centers of stator teeth of A-phase and B-phase (angular distance of stator poles, stator pole pitch). In this embodiment, θ equals to 60 degrees, the angle α represents the included angle between the vector sum $\vec{R}$ and the direction of A-phase stator tooth's magnetic pole (i.e. $\vec{R}$ vs. a-axis). Four angle positions are shown as vector $\vec{R}$ rotates from b-axis to a-axis (i.e. $\vec{R}$ approaching a-axis), and they are α=θ, α=α1, α=α2 and α=0. FIG. 2B shows the four respective positions of vector $\vec{A}$ in the A-phase waveform, when the angle a changes from α=θ, α=α1, α=α2 to α=0 the vector $\vec{A}$ changes from zero to $\vec{R}$. FIG. 2C shows that when α=θ, vector $\vec{A}$ equals zero and vector $\vec{B}$ equals R. When α=0, vector $\vec{A}$ equals R and vector $\vec{B}$ equals zero. FIGS. 2D and 2E show that when α equals α1 and α2 respectively, vector $\vec{R}$ equals the sum of vector $\vec{A}$ and vector $\vec{B}$, and from the right triangle in the figure, we can get the following equations:

$$R \sin \alpha = B \sin \theta \quad (1)$$

$$R \cos \alpha = A + B \cos \theta \quad (2)$$

From equations (1) and (2), we can get:

$$B = R \sin\alpha / \sin\theta \quad (3)$$

$$\begin{aligned} A &= R\cos\alpha - B\cos\theta \\ &= R\cos\alpha - R\sin\alpha \, \cos\theta/\sin\theta \end{aligned} \quad (4)$$

θ is the angular distance of adjacent stator poles (stator pole pitch). α is the included angle between the rotating magnetic field vector sum and the stator pole direction. R is the strength of the magnetic field vector sum $\vec{R}$. A is the strength of A-phase magnetic field vector $\vec{A}$. B is the strength of B-phase magnetic field vector $\vec{B}$. The inductance of the stator coil is supposed to be L. Since the θ, R are known values, and the A-phase and B-phase's magnetic field vectors are proportional to the A-phase and B-phase's currents in the coils respectively, therefore the equations (3) and (4) can be used to represent the relations between the driving currents of A-phase and B-phase and the included angle α. And, applying different α values to equations (3) and (4), we can get the reference values of the respective driving currents of A-phase and B-phase at different included angles. Therefore, the controller of the AC motor can get the reference current values A and B to generate the actually required currents for A-phase and B-phase to drive the AC motor. And when using such currents of A-phase and B-phase according to the equations to drive the AC motor, a steadily rotating and substantially no-ripple (or smallest-ripple) magnetic field vector sum $\vec{R}$ can be generated. And the strength of the aforementioned magnetic vector sum $\vec{R}$ can be adjusted according to demands of user (such as multiplied by a value). And if the AC motor uses concentrated windings, the stator pole pitch θ is equal to the angular distance between centers of adjacent stator slots, or equals to the included angle of centers of adjacent stator teeth, or equals to the angular distance between adjacent stator poles. If the motor is using distributed windings, θ equals to the angular distance between adjacent stator poles.

FIGS. 3A to 3E show the vector sum $\vec{R}$ rotating from a-axis to the next b-axis. Please refer to the previous descriptions relating to FIGS. 2A to 2E, and the similar details are not repeated here.

In the following Table 1 and in FIG. 4A to FIG. 4D are the drive current table and the current waveform and vector diagram for an embodiment according to the invention. The current values of each phase in Table 1 are shown and are calculated according to the equations (3) and (4). In Table 1 the row "Phase A", "Phase B" and "Phase C" are the reference current values for the A, B and C phases, wherein the stator pole pitch is 60 degrees (θ=60 degrees), the magnetic field sum strength is 1.5 (R=1.5), and the magnetic field included angle α varies from zero to 60 degrees to calculate the driving currents for a three-phase, six-stator-pole and 60-degree stator pole pitch motor (the motor coils are supposed to use concentrated windings), and a zero current time is inserted in each phase currents to separate the three phase currents, so that at any time there are no more than two phase currents that are driving the motor, that means different pairs of two phase currents are used in turn to drive the motor, when any phase current is at its peak value, the other phases of currents are substantially zero (please refer to FIG. 4A at time t=π/3、t=2π/3 及 t=π), and so as to avoid the vector cancellation and the invalid or useless magnetic fields are eliminated or reduced to the lowest level, so the power can be saved. In Table 1 the phase A current values along the time-axis from phase angle of zero to 180 degrees are listed, only the current values of the positive-half cycle are listed, the negative-half cycle (180~360 degrees) is omitted because it is symmetric to the positive-half cycle, in row 1 of Table 1 it is the phase angle of the driving current, i.e. the time-axis, in row 2 it is the angle Alpha (α) which varies from zero to 60 degrees repeatedly, α represents the included angle between the direction of the magnetic field sum and the salient direction of the stator pole, and when α changes from zero to 60 degrees, it represents the included angle's change when the magnetic field sum rotates and directs from one stator tooth magnetic pole center to the next, in row 3~5 are the phase A, B and C driving current values calculated from the equations (3) and (4), in row 6 it is the magnetic field sum's strength calculated from the three phase currents, the strength is kept at a value of 1.5 steadily as expected, in row 7 it is the calculated rotation angle of the magnetic field sum, in a half-cycle time the direction changes and rotates steadily from −60 degrees to 120 degrees (i.e. the magnetic field vector sum is rotating and its rotation angle is increasing or decreasing with a change rate proportional to the change rate of the phase angle of the power source). In other words, the magnetic field sum's strength substantially has no ripples (i.e. with the theoretical ideal values it can be completely ripple free), and its change rate of rotation angle or movement is proportional to the change rate of the phase angle of the driving currents.

TABLE 1

| 1 | phase angle | 0 | 5 | 10 | 15 | 20 | 25 | 30 |
|---|---|---|---|---|---|---|---|---|
| 2 | Alpha | 60 | 55 | 50 | 45 | 40 | 35 | 30 |
| 3 | Phase A | 0 | 0.151 | 0.3008 | 0.4483 | 0.5924 | 0.732 | 0.866 |
| 4 | Phase B | 0 | 0 | 0 | 0 | 0 | 0 | 0 |
| 5 | Phase C | −1.500 | −1.419 | −1.327 | −1.225 | −1.113 | −0.993 | −0.866 |
| 6 | Strength of the magnetic field sum | 1.500 | 1.500 | 1.500 | 1.500 | 1.500 | 1.500 | 1.500 |
| 7 | Rotation angle of the magnetic field sum | −60.00 | −55.00 | −50.00 | −45.00 | −40.00 | −35.00 | −30.00 |

| 1 | phase angle | 35 | 40 | 45 | 50 | 55 | 60 |
|---|---|---|---|---|---|---|---|
| 2 | Alpha | 25 | 20 | 15 | 10 | 5 | 0 |
| 3 | Phase A | 0.9935 | 1.1133 | 1.2247 | 1.3268 | 1.4188 | 1.5 |
| 4 | Phase B | 0 | 0 | 0 | 0 | 0 | 0 |
| 5 | Phase C | −0.732 | −0.592 | −0.448 | −0.301 | −0.151 | 0 |
| 6 | Strength of the magnetic field sum | 1.500 | 1.500 | 1.500 | 1.500 | 1.500 | 1.500 |
| 7 | Rotation angle of the magnetic field sum | −25.00 | −20.00 | −15.00 | −10.00 | −5.00 | 0.00 |

| 1 | phase angle | 65 | 70 | 75 | 80 | 85 | 90 |
|---|---|---|---|---|---|---|---|

TABLE 1-continued

| | | | | | | | |
|---|---|---|---|---|---|---|---|
| 2 | Alpha | 5 | 10 | 15 | 20 | 25 | 30 |
| 3 | Phase A | 1.4188 | 1.3268 | 1.2247 | 1.1133 | 0.9935 | 0.866 |
| 4 | Phase B | 0.151 | 0.3008 | 0.4483 | 0.5924 | 0.732 | 0.866 |
| 5 | Phase C | 0 | 0 | 0 | 0 | 0 | 0 |
| 6 | Strength of the magnetic field sum | 1.500 | 1.500 | 1.500 | 1.500 | 1.500 | 1.500 |
| 7 | Rotation angle of the magnetic field sum | 5.00 | 10.00 | 15.00 | 20.00 | 25.00 | 30.00 |
| 1 | phase angle | 95 | 100 | 105 | 110 | 115 | 120 |
| 2 | Alpha | 35 | 40 | 45 | 50 | 55 | 60 |
| 3 | Phase A | 0.732 | 0.5924 | 0.4483 | 0.3008 | 0.151 | 0 |
| 4 | Phase B | 0.9935 | 1.1133 | 1.2247 | 1.3268 | 1.4188 | 1.5 |
| 5 | Phase C | 0 | 0 | 0 | 0 | 0 | 0 |
| 6 | Strength of the magnetic field sum | 1.500 | 1.500 | 1.500 | 1.500 | 1.500 | 1.500 |
| 7 | Rotation angle of the magnetic field sum | 35.00 | 40.00 | 45.00 | 50.00 | 55.00 | 60.00 |
| 1 | phase angle | 125 | 130 | 135 | 140 | 145 | 150 |
| 2 | Alpha | 55 | 50 | 45 | 40 | 35 | 30 |
| 3 | Phase A | 0 | 0 | 0 | 0 | 0 | 0 |
| 4 | Phase B | 1.4188 | 1.3268 | 1.2247 | 1.1133 | 0.9935 | 0.866 |
| 5 | Phase C | 0.151 | 0.301 | 0.448 | 0.592 | 0.732 | 0.866 |
| 6 | Strength of the magnetic field sum | 1.500 | 1.500 | 1.500 | 1.500 | 1.500 | 1.500 |
| 7 | Rotation angle of the magnetic field sum | 65.00 | 70.00 | 75.00 | 80.00 | 85.00 | 90.00 |
| 1 | phase angle | 155 | 160 | 165 | 170 | 175 | 180 |
| 2 | Alpha | 25 | 20 | 15 | 10 | 5 | 0 |
| 3 | Phase A | 0 | 0 | 0 | 0 | 0 | 0 |
| 4 | Phase B | 0.732 | 0.5924 | 0.4483 | 0.3008 | 0.151 | 0 |
| 5 | Phase C | 0.993 | 1.113 | 1.225 | 1.327 | 1.419 | 1.500 |
| 6 | Strength of the magnetic field sum | 1.500 | 1.500 | 1.500 | 1.500 | 1.500 | 1.500 |
| 7 | Rotation angle of the magnetic field sum | 95.00 | 100.00 | 105.00 | 110.00 | 115.00 | 120.00 |

Figure 4A:
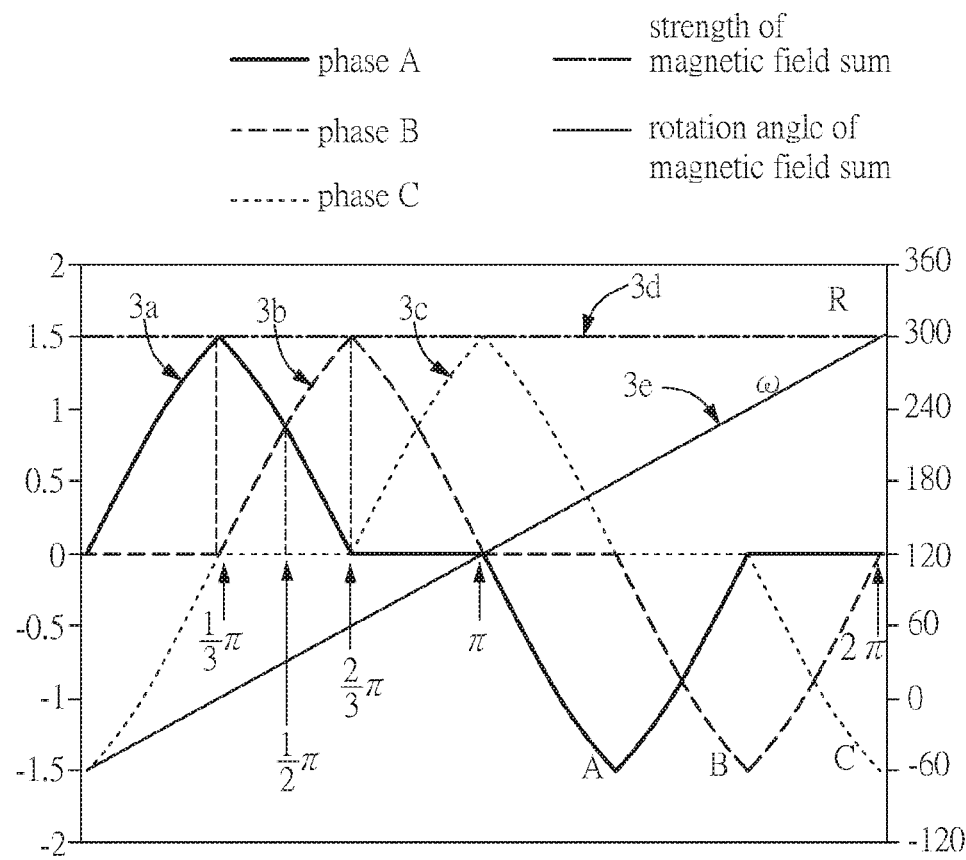
FIGS. 4A to 4D are schematic diagrams that depict the current waveforms of an embodiment of the invention for driving a three-phase motor.

In FIGS. 4A to 4D, the waveforms and vectors are shown according to the embodiments of the disclosure. FIG. 4A are current waveforms drawn from the current values in Table 1 according to the first embodiment of the invention, including the phase A current 3a, phase B current 3b, phase C current 3c, the strength 3d of the magnetic field sum and the rotation angle 3e of the magnetic field sum. Please refer to the center horizontal time axis X, the phase A current 3a is a positive curved-triangle current at time t=0 to 2π/3 (drawn according to the current values in row 3 of Table 1), and zero current at time t=2π/3 to π, and a negative curved-triangle current at time t=π to 5π/3, and zero current at time t=5π/3 to 2π. The phase B current is lagged for 1π/3 to the phase A current. The phase C current is lagged for 2π/3 to the phase A current. In one cycle time of 2π, the magnetic field sum angle 3e rotates steadily from −60 to 300 degrees (please refer to the right side Y axis scale). The magnetic field sum strength 3d is kept at a strength of 1.5 (please refer to the left side Y axis scale). From FIG. 4A, the driving waveform according to the embodiment comprises a current waveform with a curved-triangle shape (triangle with two curved sides) and a zero current period. The current waveform of the embodiment is referred as a "curved-triangle" waveform, and it is characterized in that its rising and falling slopes fall between a sine-wave and a triangle-wave of the same peak point. In this embodiment, in the three-phase currents, at any time there are at most only two phases of currents are overlapped in time, which means at any time there is only two phases of currents at most that are outputting to drive the motor stator coils. Meanwhile, the rest phases of currents are substantially zero or being shut off, and different two phases of currents are sequentially grouped into a series of two-phase pairs and driving the motor coils pair by pair. For example, in FIG. 4A, from left to right there are two-phase current pairs of (-C,A), (A,B), (B,C), (C,-A), (-A,-B), and (-B,-C). These two-phase pairs all drive the motor one by one with overlap. Each phase's positive current time is overlapped with another phase's positive current time. The first phase's (phase A's) positive-rising current time is overlapped with the last phase's (phase C's) negative current time (i.e. -C & A), and the last phase's (phase C's) positive-falling current time is overlapped with the first phase's (phase A's) negative current time (i.e. C & -A). At least one phase's (phase B's in this case) positive current time (ex. phase B's $1\pi/3 \sim \pi$ time) is only overlapped with the positive current time of its preceding and succeeding phases (i.e. phase A & C), and the at least one phase's (phase B's) negative current time (ex. phase B's $4\pi/3 \sim 2\pi$ time) is overlapped only with the negative current time of its preceding and succeeding phases (i.e. phase A & C). For example, in the phase B current $3b$ in FIG. 4A, the positive current time is from $1\pi/3$ to $\pi$, and the time $1\pi/3$ to $2\pi/3$ is overlapped with the preceding phase A's positive current time (i.e. group A,B), and the time $2\pi/3$ to $\pi$ is overlapped with the succeeding phase C's positive current time (i.e. groups B and C). The negative current time is symmetric to the positive time, forming the two overlapped time sets of (-A,-B) and (-B,-C). Since the magnetic field vector sum of the embodiment uses the sum of only two phases of magnetic field vectors, the mutual cancellation of multiphase vectors resulted from the invalid anti-rotation magnetic fields (vectors) is eliminated or reduced. So, in a multiphase (three phases or more) system, the current used to generate the invalid magnetic fields is therefore saved. Both the copper loss and iron loss are also reduced and the goal of saving power is achieved.

Figures 4B, 4C, 4D:
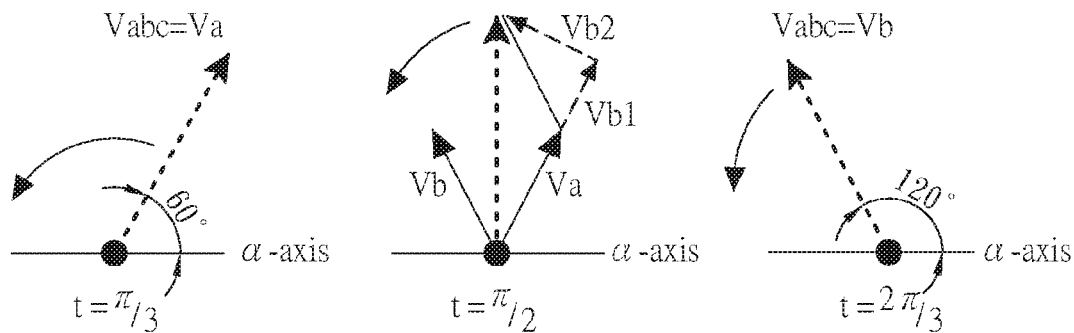

FIGS. 4B to 4D show the magnetic field vector sum at three different time points of FIG. 4A. Phase A current $3a$ generates the magnetic vector Va. Phase B current $3b$ generates the magnetic vector Vb. Va and Vb are combined to form the magnetic field vector sum Vabc. FIG. 4B shows that at time $t=\pi/3$, the included angle between the magnetic field vector sum Vabc and the $\alpha$-axis is 60 degrees, the Vb equals zero, and Vabc equals Va. FIG. 4C shows that at time $t=\pi/2$, the included angle between the magnetic field vector sum Vabc and the $\alpha$-axis is 90 degrees, and Vabc equals the sum of Va and Vb, and Vb has two components Vb1 and Vb2. FIG. 4D shows that at time $t=2\pi/3$, the included angle between the magnetic field vector sum Vabc and the $\alpha$-axis is 120 degrees, the Va equals zero, and Vabc equals Vb. During rotation, the strength of Vabc is always kept at 1.5. FIGS. 4B to 4D show that, during the rotation of the magnetic field vector sum Vabc, the mutual vector cancellation is reduced to the lowest level, which means the invalid magnetic fields are at the lowest level, and the wasted current is saved.

Figure 3A:
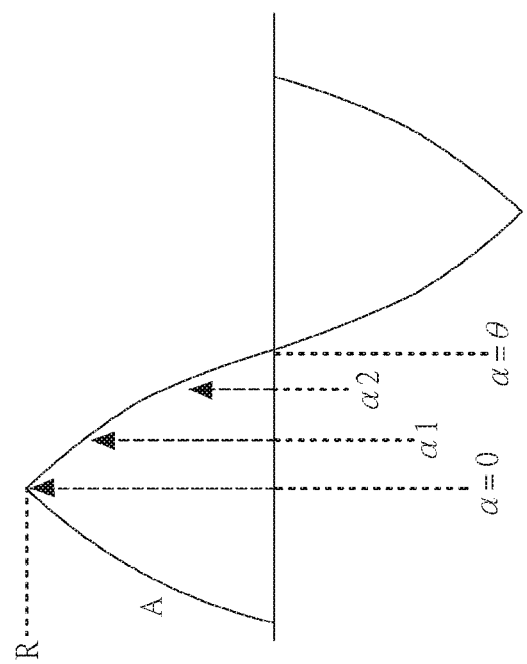
FIGS. 3A to 3E show the magnetic field vector sum and its components and the equation elements for calculating the two-phase currents of the invention.
Figure 3B:
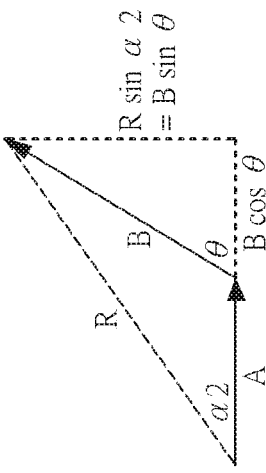
Figure 3C:
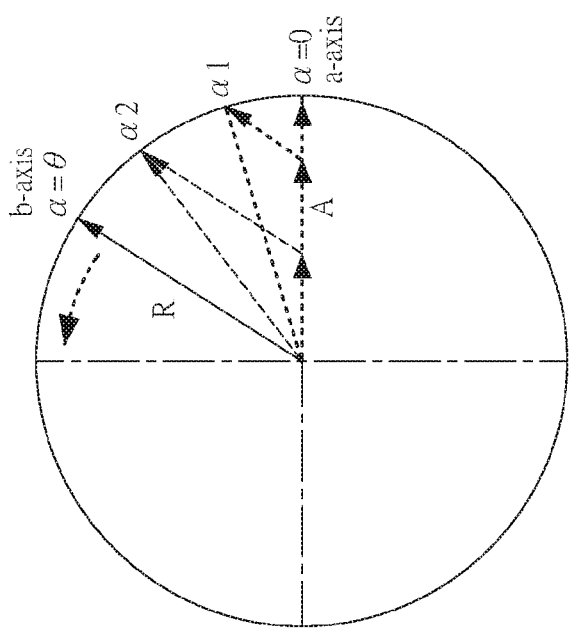
Figure 3D:
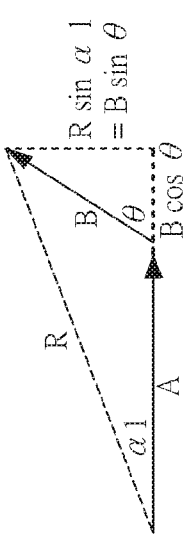
Figure 3E:
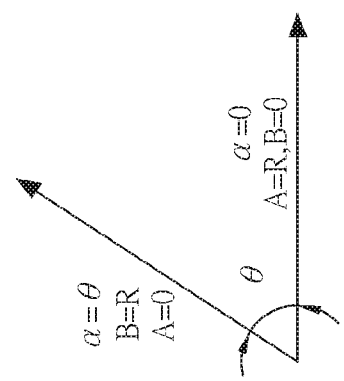

Please also compare the waveform in FIG. 4A and the sine wave in FIG. 1B. If in FIG. 1B the sine wave's peak value is 1, the strength of the magnetic field sum of the three-phase sine-wave currents equals to 1.5L (L is the coil's inductance). So, for the embodiment, if the curved-triangle current's peak value is set to 1.5 (as shown in FIG. 3B), we can generate the same magnetic field sum strength (i.e. 1.5L) as the conventional three-phase sine waves of an amplitude 1.0 in FIG. 1B. The current consumption of the curved-triangle waveform is equal to its area. As we sum up the phase A's half-cycle current values in row 3 of Table 1 and compare the sum with the half-cycle sine-wave current's sum, the result shows that the average of the curved-triangle waveform currents are lower. It means that, according to the embodiment, with the same torque output, a 60-degree stator pole pitch (six-stator-pole) three-phase motor can save power. The copper loss ($I^2R$) from the driving current and the iron loss from the magnetic flux in the motor could also be reduced as compared to a conventional sine-wave driven motor.

Considering in the vector space, when using three or more phases as the power source, in an embodiment of the disclosure only two phase vectors are used to replace the original three or more phase vectors to sum up a vector sum. At any time there are only two of the multiphase currents are used to generate the phase vectors to combine and sum up. Because the vector length represents the current value, and when using two vectors to sum up the same vector sum, the total length of the two phase vectors is shorter than the three (or more) phase vectors (under the condition of the same stator pole pitch). The length difference can be taken as the current saved. Therefore, it means that, with two vectors, less current is required to generate the same magnetic vector sum of the same strength and rotating as steadily (substantially with no ripples) as in a conventional multiphase motor. For two-phase motors, in an embodiment of the disclosure, two curved-triangle phase currents are used to replace the conventional sine-wave currents to drive a motor with a smaller stator pole pitch. It is shown that, compared to two-phase sine-wave currents with 90-degree stator pole pitch, lesser current is required to generate the same magnetic strength whereas the same steady and substantially no-ripple rotation is still kept. The two-phase motors now can have a stator pole pitch of less than 90 degrees (i.e. it's no longer limited to 90 degrees), and the number of stator poles can be greater than 4. And, still the magnetic field sum can be kept at the same strength and rotate steadily and substantially without ripples.

Figure 5:
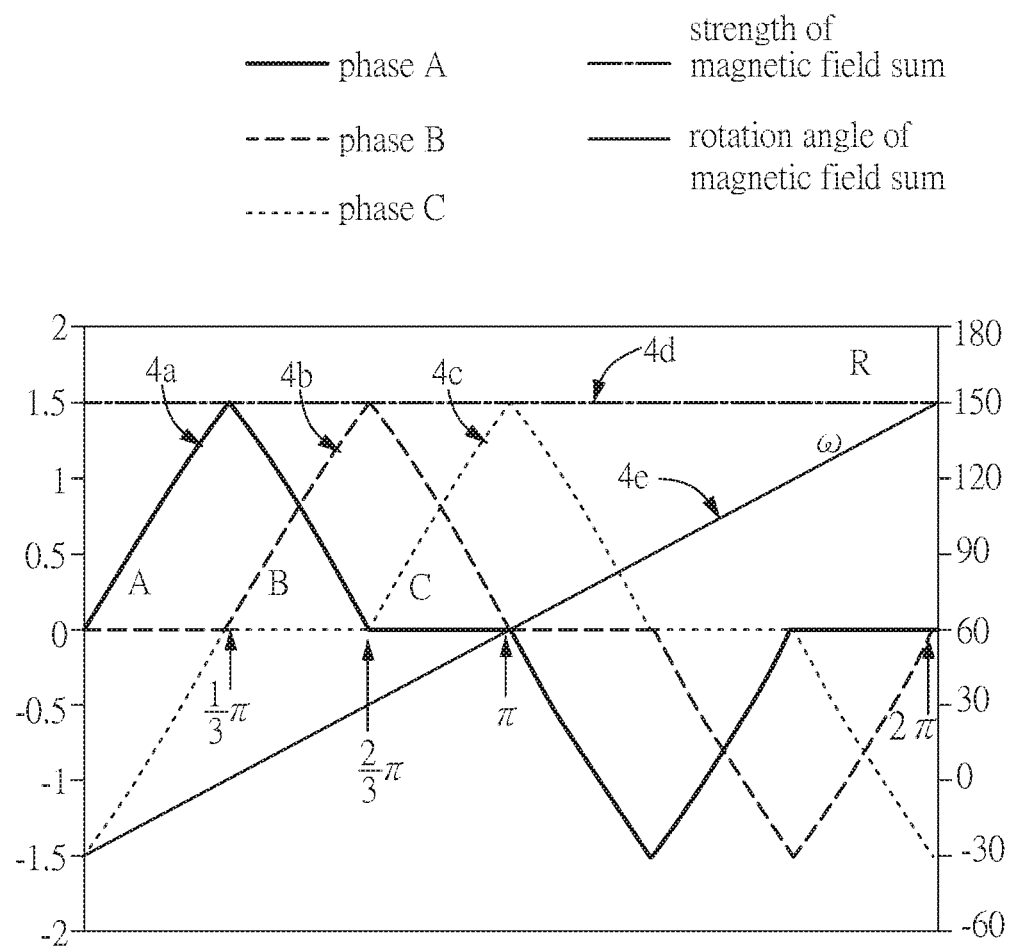
FIGS. 5 to 7 are schematic diagrams that depict the current waveforms of some embodiments of the invention for driving a multiphase motor.

The following Table 2 shows a current table of an embodiment of the disclosure that is used to drive a three-phase motor with a stator pole pitch of 30 degrees or with twelve stator poles. FIG. 5 shows the curved-triangle waveforms according to the data of Table 2. Table 2 is similar to Table 1, but has a different stator pole pitch of 30 degrees, which means two different phases of curved-triangle currents generate two magnetic field vectors with an included angle of 30 degrees. Comparing the average of the curved-triangle currents with the average of sine-wave currents, the required drive currents are lower. And, after comparing the data in Table 2 and Table 1, it is shown that smaller stator pole pitch leads to a smaller current. This result can be expected and seen from the equation (3) and (4), and reduced copper loss and iron loss and motor heat could also be expected.

TABLE 2

| 1 | phase angle | 0 | 5 | 10 | 15 | 20 | 25 | 30 |
|---|---|---|---|---|---|---|---|---|
| 2 | Alpha | 30 | 27.5 | 25 | 22.5 | 20 | 17.5 | 15 |

TABLE 2-continued

| | | | | | | | | |
|---|---|---|---|---|---|---|---|---|
| 3 | Phase A | 0 | 0.1309 | 0.2615 | 0.3916 | 0.5209 | 0.6493 | 0.7765 |
| 4 | Phase B | 0 | 0 | 0 | 0 | 0 | 0 | 0 |
| 5 | Phase C | −1.500 | −1.385 | −1.268 | −1.148 | −1.026 | −0.902 | −0.776 |
| 6 | Strength of the magnetic field sum | 1.500 | 1.500 | 1.500 | 1.500 | 1.500 | 1.500 | 1.500 |
| 7 | Rotation angle of the magnetic field sum | −30.00 | −27.50 | −25.00 | −22.50 | −20.00 | −17.50 | −15.00 |

| | | | | | | | |
|---|---|---|---|---|---|---|---|
| 1 | phase angle | 35 | 40 | 45 | 50 | 55 | 60 |
| 2 | Alpha | 12.5 | 10 | 7.5 | 5 | 2.5 | 0 |
| 3 | Phase A | 0.9021 | 1.0261 | 1.1481 | 1.2679 | 1.3852 | 1.5 |
| 4 | Phase B | 0 | 0 | 0 | 0 | 0 | 0 |
| 5 | Phase C | −0.649 | −0.521 | −0.392 | −0.261 | −0.131 | 0 |
| 6 | Strength of the magnetic field sum | 1.500 | 1.500 | 1.500 | 1.500 | 1.500 | 1.500 |
| 7 | Rotation angle of the magnetic field sum | −12.50 | −10.00 | −7.50 | −5.00 | −2.50 | 0.00 |

| | | | | | | | |
|---|---|---|---|---|---|---|---|
| 1 | phase angle | 65 | 70 | 75 | 80 | 85 | 90 |
| 2 | Alpha | 2.5 | 5 | 7.5 | 10 | 12.5 | 15 |
| 3 | Phase A | 1.3852 | 1.2679 | 1.1481 | 1.0261 | 0.9021 | 0.7765 |
| 4 | Phase B | 0.1309 | 0.2615 | 0.3916 | 0.5209 | 0.6493 | 0.7765 |
| 5 | Phase C | 0 | 0 | 0 | 0 | 0 | 0 |
| 6 | Strength of the magnetic field sum | 1.500 | 1.500 | 1.500 | 1.500 | 1.500 | 1.500 |
| 7 | Rotation angle of the magnetic field sum | 2.50 | 5.00 | 7.50 | 10.00 | 12.50 | 15.00 |

| | | | | | | | |
|---|---|---|---|---|---|---|---|
| 1 | phase angle | 95 | 100 | 105 | 110 | 115 | 120 |
| 2 | Alpha | 17.5 | 20 | 22.5 | 25 | 27.5 | 30 |
| 3 | Phase A | 0.6493 | 0.5209 | 0.3916 | 0.2615 | 0.1309 | 0 |
| 4 | Phase B | 0.9021 | 1.0261 | 1.1481 | 1.2679 | 1.3852 | 1.5 |
| 5 | Phase C | 0 | 0 | 0 | 0 | 0 | 0 |
| 6 | Strength of the magnetic field sum | 1.500 | 1.500 | 1.500 | 1.500 | 1.500 | 1.500 |
| 7 | Rotation angle of the magnetic field sum | 17.50 | 20.00 | 22.50 | 25.00 | 27.50 | 30.00 |

| | | | | | | | |
|---|---|---|---|---|---|---|---|
| 1 | phase angle | 125 | 130 | 135 | 140 | 145 | 150 |
| 2 | Alpha | 27.5 | 25 | 22.5 | 20 | 17.5 | 15 |
| 3 | Phase A | 0 | 0 | 0 | 0 | 0 | 0 |
| 4 | Phase B | 1.3852 | 1.2679 | 1.1481 | 1.0261 | 0.9021 | 0.7765 |
| 5 | Phase C | 0.131 | 0.261 | 0.392 | 0.521 | 0.649 | 0.776 |
| 6 | Strength of the magnetic field sum | 1.500 | 1.500 | 1.500 | 1.500 | 1.500 | 1.500 |
| 7 | Rotation angle of the magnetic field sum | 32.50 | 35.00 | 37.50 | 40.00 | 42.50 | 45.00 |

| | | | | | | | |
|---|---|---|---|---|---|---|---|
| 1 | phase angle | 155 | 160 | 165 | 170 | 175 | 180 |
| 2 | Alpha | 12.5 | 10 | 7.5 | 5 | 2.5 | 0 |

TABLE 2-continued

| | | | | | | | |
|---|---|---|---|---|---|---|---|
| 3 | Phase A | 0 | 0 | 0 | 0 | 0 | 0 |
| 4 | Phase B | 0.6493 | 0.5209 | 0.3916 | 0.2615 | 0.1309 | 0 |
| 5 | Phase C | 0.902 | 1.026 | 1.148 | 1.268 | 1.385 | 1.500 |
| 6 | Strength of the magnetic field sum | 1.500 | 1.500 | 1.500 | 1.500 | 1.500 | 1.500 |
| 7 | Rotation angle of the magnetic field sum | 47.50 | 50.00 | 52.50 | 55.00 | 57.50 | 60.00 |

Figure 6:
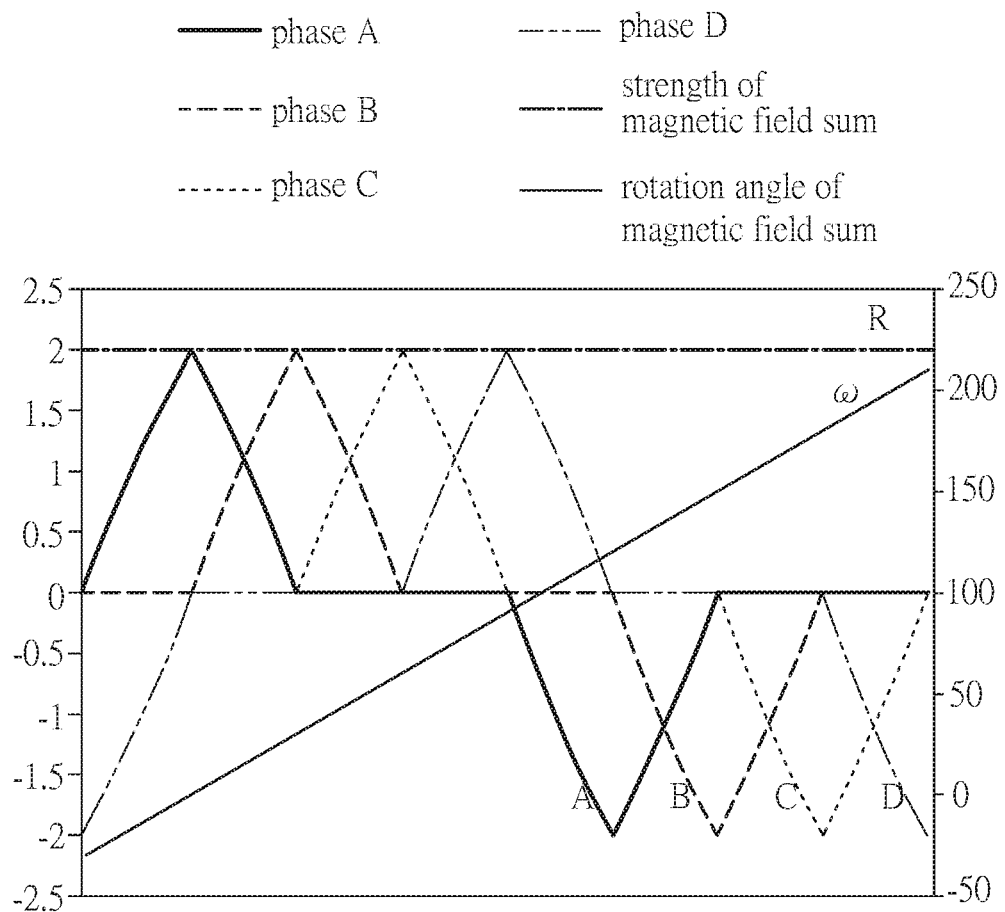

FIG. 6 shows the four-phase curved-triangle current waveform of an embodiment according to the disclosure which is used to drive a four-phase AC motor with a stator pole pitch of 30 degrees and twelve stator poles. The four-phase curved-triangle currents must have a peak of 2.0 to generate the same magnetic field strength of three-phase sine-wave currents with a peak of 1.0. Comparing with the average three-phase sine-wave currents, the required drive currents are lower.

Figure 7:
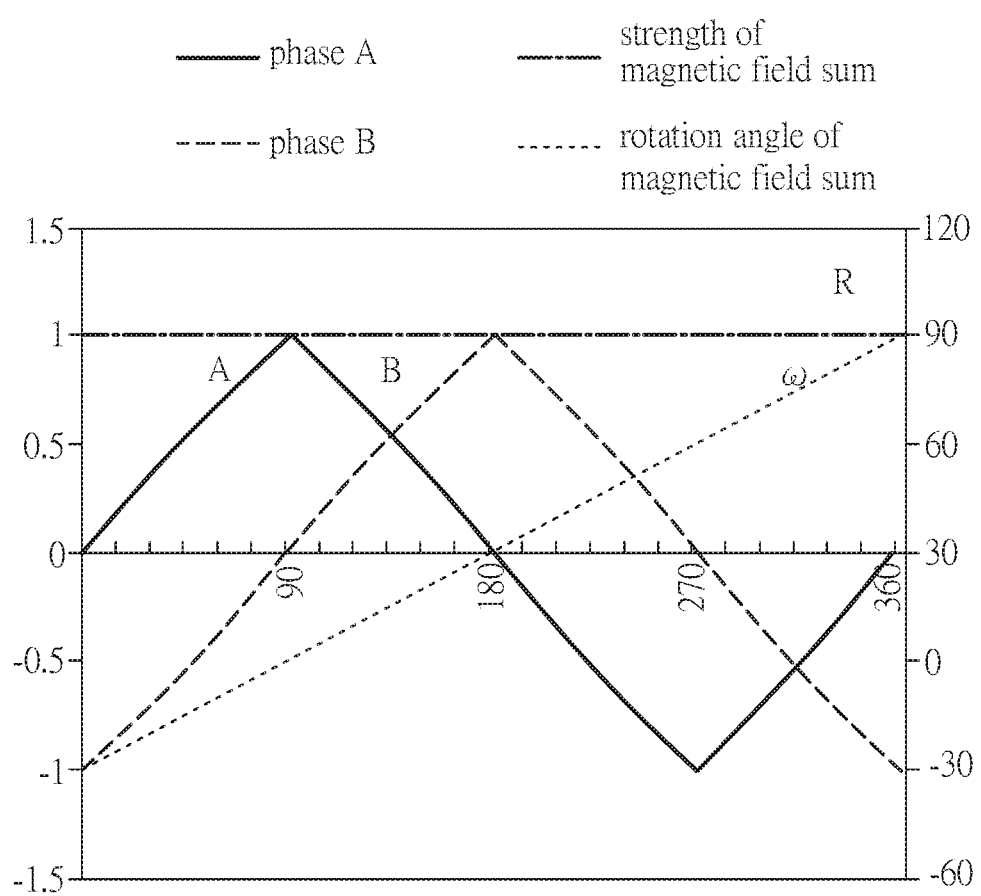

FIG. 7 shows the curved-triangle waveform of an embodiment of the disclosure which is used to drive a two-phase AC motor with a stator pole pitch of 30 degrees and twelve stator poles. A two-phase twelve-slot AC motor has six pairs of stator teeth, and a three-phase twelve-slot AC motor has only 4 pairs of stator teeth (6:4=1.5:1). Both motors all have twelve stator coils. So, the two-phase curved-triangle currents can generate the same magnetic field sum strength of a three-phase sine-wave currents with the same peak current value (i.e. have the same peak current value of 1.0). Comparing with the three-phase sine-wave currents, the power saving rate of the two-phase curved-triangle currents is about 30%. Furthermore, according to the reasons mentioned above, with the same torque output, the power consumption of a conventional two-phase sine-wave four-stator-pole (or 90-degree-stator-pole-pitch) motor is 1.5 times of a sine-wave three-phase six-stator-pole motor. The method of the embodiment not only can make a more-than-four-stator-pole two-phase motor to have a rippleless rotation, but also can make the two-phase motor to use lesser power than a three-phase sine-wave motor while generating the same torque output.

Please refer to FIGS. 4A, 5, 6 and 7. When using more than three phases of currents as the power source, a zero current time is inserted to each half cycle of each phase current so that at any time no more than two phases currents are outputting to drive the motor. So, in a driving cycle of each phase current, there are one curved-triangle current time and one zero current time in each positive-half or negative-half cycle time. Or, in each half cycle there is a zero current time. For example, if the multiphase power source has N phases, in each half cycle time of each phase current, the curved-triangle current occupies 2/N of the half cycle time, and the rest (N-2)/N of the half cycle time is zero current. So, in a three-phase power source, each phase current has a zero current time of (3-2)/3=1/3 of its half-cycle time. In a four-phase power source, each phase current has a zero current time of (4-2)/4=1/2 of its half-cycle time. For a two-phase power source the zero current time is zero (2-2)/2=0, which means it's only a zero crossing point of the current (no need to insert any zero current time). When any phase current is at its peak value, the other phase currents are substantially zero.

From the embodiments depicted in FIGS. 4A, 5, 6 and 7, two different phases of currents are sequentially grouped into phase pairs to drive the motor. If the power source has N phases, the phase difference between the phase currents is 180/N. For example, in FIG. 4A, the three curved-triangle phase currents A, B and C have a phase difference of 180/3=60 degrees between them. In FIG. 6, the four curved-triangle phase currents A, B, C and D have a phase difference of 180/4=45 degrees. In FIG. 7, the two curved-triangle phase currents A and B have a phase difference of 180/2=90 degrees.

From the embodiments depicted in FIGS. 4A, 5 and 6, when N phases of currents are used to drive the motor, two different phases of currents are sequentially grouped into a series of phase pairs and driving the motor pair by pair. Each phase current's positive current time is overlapped with another phase current's positive current time, the first phase's (Phase A) positive-rising current time is overlapped with the last phase's (Phase N) negative current time. The last phase's (Phase N) positive-falling current time is overlapped with the first phase's (Phase A) negative current time. And, when measured along the same coil winding direction of adjacent stator coils, except the first phase A and the last phase N, there are at least N-2 phases' (Phase B to Phase N-1) positive current time is only overlapped with its preceding and succeeding phases' positive current time. And the N-2 phases' (Phase B to Phase N-1) negative current time is only overlapped with its preceding and succeeding phases' negative current time. For example, in FIG. 4A, (where N=3) the phase A, B and C's positive current time is two by two overlapped. Phase A's positive-rising current time is overlapped with phase C's negative current time, and phase C's positive-falling current time is overlapped with phase A's negative current time. At least one (N-2=3-2=1) phase's (i.e. phase B's) positive current time is only overlapped with its preceding phase A's and its succeeding phase C's positive current time, and phase B's negative current time is only overlapped with its preceding phase A's and its succeeding phase C's negative current time.

Figure 8:
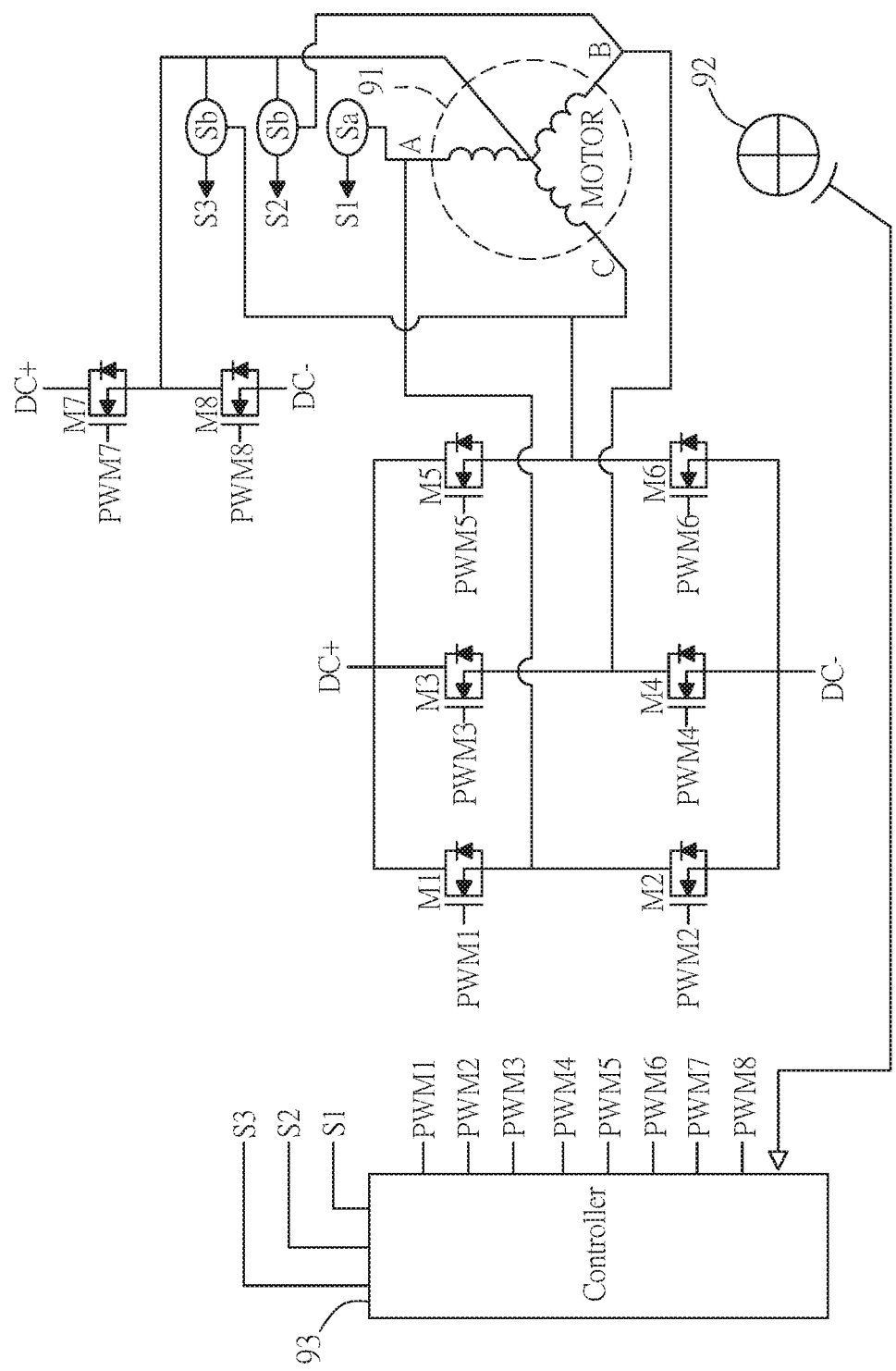
FIG. 8 is a circuit diagram of a motor driver of an embodiment of the invention.

FIG. 8 shows a circuit diagram for a three-phase curved-triangle current driver of an embodiment of the invention. Comparing to the conventional driver circuits as shown in FIG. 1A, in order to generate the curved-triangle current of the invention, two driving signals PWM7 and PWM8 and two transistor switches M7 and M8 are added to the circuits depicted in FIG. 8, and the transistor switches' outputs are connected to the center of the Y-connected stator coils of the motor 91. So, the circuits can now provide two phases of positive current and/or negative current at the same time, and meanwhile force the third phase to output zero current.

Furthermore, three back-EMF detectors Sa, Sb and Sc are added to the circuits depicted in FIG. 8. The three back-EMF detectors are connected to phase A, B and C's coils, and output the detected back-EMF signals S1, S2 and S3 respectively to the control circuit (i.e. controller 93 in FIG. 8). The detectors Sa, Sb and Sc can detect the back-EMF from the coils during the zero current time of the stator coils, so the controller 93 can estimate the rotor's position with the detected back-EMF, and to use the position data as a parameter to modify the driving currents. The controller 93 performs real-time calculation or uses look-up tables or other software or hardware techniques with the equations (3) and (4) of the invention to get the current values, and drives the motor based on the current values.

In the following Table 3, a reference current value table for a two-phase twelve-stator-pole motor of an embodiment of the invention is listed. The reference values of each phase are shown and are calculated according to the equations (3) and (4).

TABLE 3

| | | | | | | | |
|---|---|---|---|---|---|---|---|
| 1 | phase angle | 0 | 5 | 10 | 15 | 20 | 25 | 30 |
| 2 | Alpha | 0 | 1.6667 | 3.3333 | 5 | 6.6667 | 8.3333 | 10 |
| 3 | Phase A | 0 | 0.0291 | 0.0581 | 0.0872 | 0.1161 | 0.1449 | 0.1736 |
| 4 | Phase B | −0.5 | −0.475 | −0.449 | −0.423 | −0.396 | −0.369 | −0.342 |
| 5 | Strength of the magnetic field sum | 0.50 | 0.500 | 0.500 | 0.500 | 0.500 | 0.500 | 0.500 |
| 6 | Rotation angle of the magnetic field sum | −30. | −28.33 | −26.67 | −25.00 | −23.33 | −21.67 | −20.00 |

| | | | | | | | |
|---|---|---|---|---|---|---|---|
| 1 | phase angle | 35 | 40 | 45 | 50 | 55 | 60 |
| 2 | Alpha | 11.667 | 13.333 | 15 | 16.667 | 18.333 | 20 |
| 3 | Phase A | 0.2022 | 0.2306 | 0.2588 | 0.2868 | 0.3145 | 0.3420 |
| 4 | Phase B | −0.315 | −0.287 | −0.259 | −0.231 | −0.202 | −0.174 |
| 5 | Strength of the magnetic field sum | 0.500 | 0.500 | 0.500 | 0.500 | 0.500 | 0.500 |
| 6 | Rotation angle of the magnetic field sum | −18.33 | −16.67 | −15.00 | −13.33 | −11.67 | −10.00 |

| | | | | | | | |
|---|---|---|---|---|---|---|---|
| 1 | phase angle | 65 | 70 | 75 | 80 | 85 | 90 |
| 2 | Alpha | 21.667 | 23.333 | 25 | 26.667 | 28.333 | 30 |
| 3 | Phase A | 0.3692 | 0.3961 | 0.4226 | 0.4488 | 0.4746 | 0.5 |
| 4 | Phase B | −0.145 | −0.116 | −0.087 | −0.058 | −0.029 | 0 |
| 5 | Strength of the magnetic field sum | 0.500 | 0.500 | 0.500 | 0.500 | 0.500 | 0.500 |
| 6 | Rotation angle of the magnetic field sum | −8.33 | −6.67 | −5.00 | −3.33 | −1.67 | 0.00 |

| | | | | | | | |
|---|---|---|---|---|---|---|---|
| 1 | phase angle | 95 | 100 | 105 | 110 | 115 | 120 |
| 2 | Alpha | 1.6667 | 3.3333 | 5 | 6.6667 | 8.3333 | 10 |
| 3 | Phase A | 0.4746 | 0.4488 | 0.4226 | 0.3961 | 0.3692 | 0.3420 |
| 4 | Phase B | 0.0291 | 0.0581 | 0.0872 | 0.1161 | 0.1449 | 0.1736 |
| 5 | Strength of the magnetic field sum | 0.500 | 0.500 | 0.500 | 0.500 | 0.500 | 0.500 |
| 6 | Rotation angle of the magnetic field sum | 1.67 | 3.33 | 5.00 | 6.67 | 8.33 | 10.00 |

| | | | | | | | |
|---|---|---|---|---|---|---|---|
| 1 | phase angle | 125 | 130 | 135 | 140 | 145 | 150 |
| 2 | Alpha | 11.667 | 13.333 | 15 | 16.667 | 18.333 | 20 |
| 3 | Phase A | 0.3145 | 0.2868 | 0.2588 | 0.2306 | 0.2022 | 0.1736 |
| 4 | Phase B | 0.2022 | 0.2306 | 0.2588 | 0.2868 | 0.3145 | 0.3420 |
| 5 | Strength of the magnetic field sum | 0.500 | 0.500 | 0.500 | 0.500 | 0.500 | 0.500 |

TABLE 3-continued

| | | | | | | | |
|---|---|---|---|---|---|---|---|
| 6 | Rotation angle of the magnetic field sum | 11.67 | 13.33 | 15.00 | 16.67 | 18.33 | 20.00 |
| | | | | | | | |
| 1 | phase angle | 155 | 160 | 165 | 170 | 175 | 180 |
| 2 | Alpha | 21.667 | 23.333 | 25 | 26.667 | 28.333 | 30 |
| 3 | Phase A | 0.1449 | 0.1161 | 0.0872 | 0.0581 | 0.0291 | 0 |
| 4 | Phase B | 0.3692 | 0.3961 | 0.4226 | 0.4488 | 0.4746 | 0.5 |
| 5 | Strength of the magnetic field sum | 0.500 | 0.500 | 0.500 | 0.500 | 0.500 | 0.500 |
| 6 | Rotation angle of the magnetic field sum | 21.67 | 23.33 | 25.00 | 26.67 | 28.33 | 30.00 |

In Table 3, the values in the row 3 "Phase A" and in the row 4 "Phase B" are the reference current values for the A and B phases, respectively. In the present embodiment, the stator pole pitch is 30 degrees ($\theta=30$ degrees), the magnetic field sum strength is 0.5 ($R=0.5$), and the magnetic field included angle a varies from zero to 30 degrees ($\alpha=0\sim30$). These parameters are used to calculate the driving currents for a two-phase, twelve-stator-pole and 30-degree stator pole pitch AC motor (and the motor coils are supposed to use concentrated windings).

In Table 3, the phase A current values along the time-axis from phase angle of zero to 180 degrees are listed. Only the current values of the positive-half cycle are listed, and the negative-half cycle (180~360 degrees) is omitted because it is symmetric to the positive-half cycle. The values in row 1 of Table 3 are the phase angles of the driving current, i.e. the time-axis. The values in row 2 are the angles Alpha ($\alpha$) which varies from zero to 30 degrees repeatedly. $\alpha$ represents the included angle between the direction of the magnetic field sum and the salient direction of the stator pole. When $\alpha$ changes from zero to 30 degrees, it represents the changing of the included angles during the rotation of the direction of the magnetic field sum from one stator tooth magnetic pole center to the next. The values in row 3 and 4 are the reference values of driving current phase A and B respectively calculated from the equations (3) and (4). The values in row 5 are the strength of the magnetic field sum calculated from the three phase currents. The strength is kept at a value of 0.5 steadily as expected. The values in row 6 are the calculated rotation angles of the magnetic field sum. In a half-cycle time, the rotation angle changes and rotates steadily from −30 degrees to 30 degrees (i.e. rotates 120 degrees in one cycle). It means the magnetic field vector sum rotates and its rotation angle is increasing or decreasing with a change rate proportional to the change rate of the phase angle of the power source. In other words, the strength of the magnetic field sum substantially has no ripples (i.e. with the theoretical ideal values it can be completely ripple free), and its change rate of rotation angle or movement is proportional to the change rate of the phase angle of the two-phase currents.

Since the magnetic field vector sum of the invention comes from the sum of only two phases of magnetic field vectors, the mutual cancellation of conventional three-phase vectors resulted from the invalid anti-rotation magnetic fields (vectors) is eliminated or reduced. So, in a multiphase (three phases or more) system, the current used to generate the invalid magnetic fields is saved, and therefore the power is saved.

Figure 9:
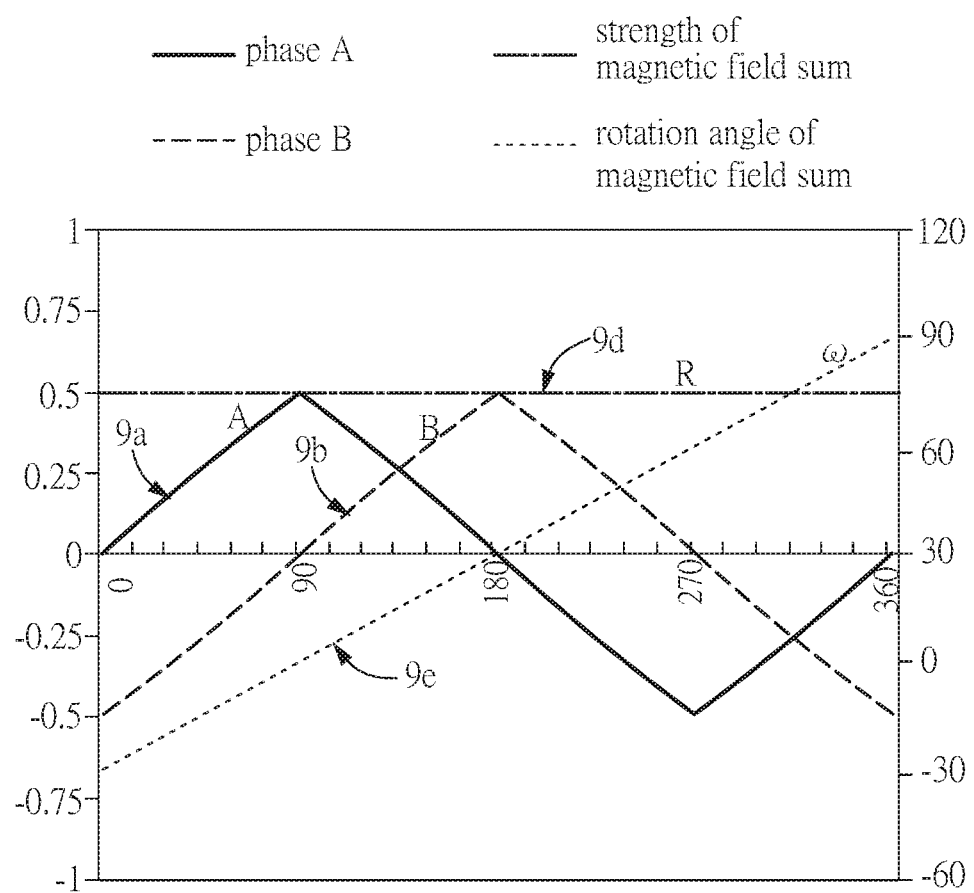
FIG. 9 is a schematic diagram that depict the two-phase current waveforms of an embodiment of the invention.
Figure 10:
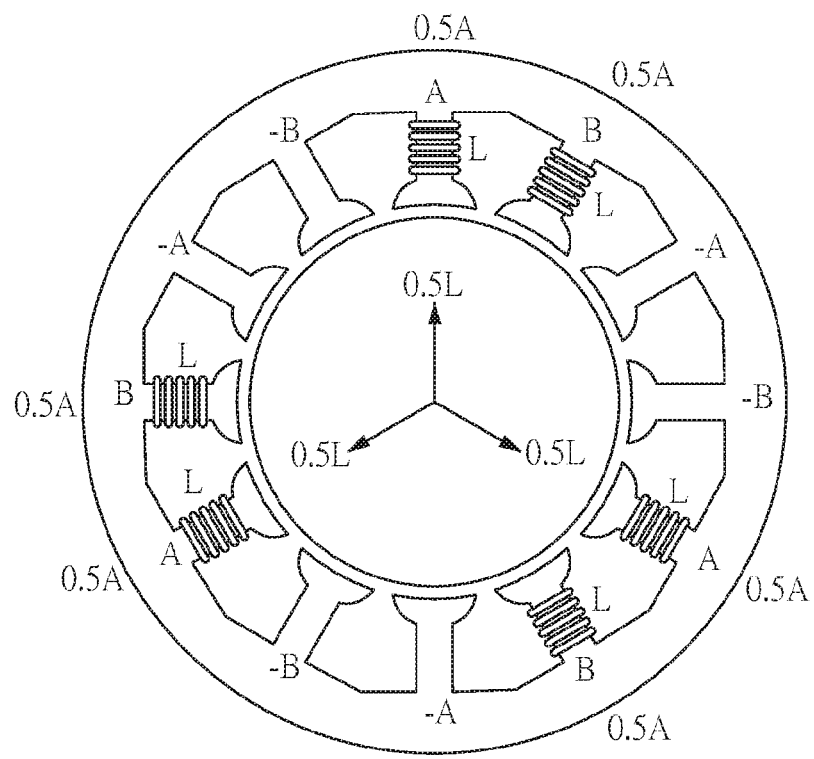
FIG. 10 is a schematic diagrams that depict a two-phase twelve-stator-pole motor of an embodiment of the invention.
Figure 11:
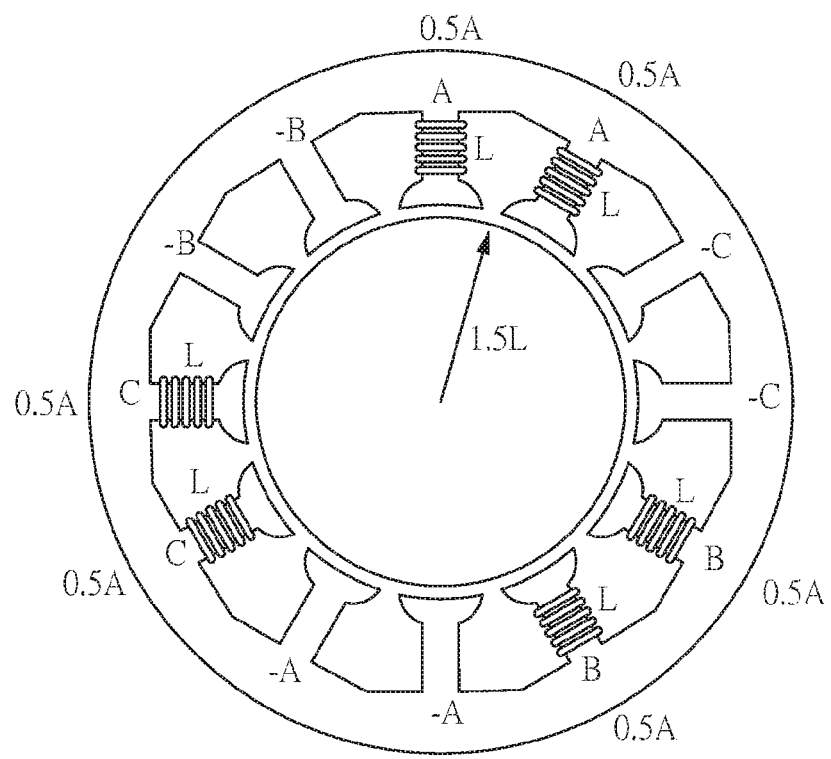
FIG. 11 is a schematic diagrams that depict a conventional three-phase six-stator-pole motor.

In another embodiment of the disclosure, the two-phase currents are used to drive an AC motor with twelve stator teeth. FIG. 9 is the current waveform drawn from the current values in Table 3 according to the embodiment of the disclosure, including the phase A current 9a, phase B current 9b, the strength 9d of the magnetic field sum, and the rotation angle 9e of the magnetic field sum. Please compare the two-phase curved-triangle waveform in FIG. 9 and the three-phase sine-wave in FIG. 1B. It is supposed that they are used to drive an AC motor with twelve stator teeth. In the two-phase system of FIG. 9, each phase current drives three stator coils, and there are 3*2 phases =6 stator coils in total (referring to FIG. 10). On the other hand, in the three-phase system of FIG. 1B, each phase current drives two stator coils, and there are also 2*3 phases =6 stator coils in total (referring to FIG. 11). In FIG. 1B, each phase's sine-wave current's peak value is one (1), and the current distributed to each stator coil is 0.5 (0.5*2=1). The strength of the magnetic field sum of the three-phase sine-wave currents from the six stator coils is equal to 1.5L (FIG. 11, L is the coil's inductance). In FIG. 9, the two-phase curved-triangle current's peak value is 0.5, and the 2-phase 6 stator coils can generate 3 rotating magnetic fields. The total rotating magnetic field sum is 0.5L*3=1.5L (see FIG. 10). So, with the two-phase curved-triangle currents depicted in FIG. 9, we can generate the equivalent total magnetic field sum (i.e. 1.5L) as the conventional three-phase sine-wave currents of amplitude 1.0 in FIG. 1B.

Furthermore, in FIG. 1B, the input power of the three-phase sine-wave system is proportional to the sum of the square of the sine-wave currents in the six stator coils (sine-wave 0.5*0.5*6). In FIG. 9, the input power of the two-phase curved-triangle system is proportional to the sum of the square of the curved-triangle currents in the six stator coils (curved-triangle 0.5*0.5*6). So, by comparing the square of the curved-triangle current values in Table 3 with the square of the sine-wave current (both have the same peak current of 0.5), the estimated power saving rate of the embodiment would be 30%. In addition, for a conventional two-phase motor with a stator pole pitch of 90 degrees and four stator poles, the power required is 1.5 times of a conventional three-phase motor for generating the same torque output. Accordingly, the method of the present embodiment not only can make a more-than-four-stator-pole two-phase AC motor to generate ripple free rotation, it also can improve a two-phase AC motor to have a higher efficiency than a three-phase AC motor while the torque output are kept the same.

From FIG. 9, the method of the embodiment of the disclosure uses two-phase currents to drive the AC motor, and the phase difference between the two curved-triangle currents is 90 degrees.

Furthermore, in many applications, motors are also used reversely as a motor generator to generate power. The principles of driving AC motors of the present disclosure could also be used to generate power reversely and more efficiently. When generating power with the invention, each rotating magnetic field generated from the rotation of the rotor drives at most two sets of coils, and induces two phases of curved-triangle currents with 90 degrees of phase difference in the coils. Please refer to FIGS. 2A to 3E, as R is the rotating magnetic field. When R is rotating, the induced currents of phase A and B are generated in the two sets of coils. At a time point when the included angle between the rotating magnetic field R and the motor stator pole direction is a, and the angular distance of two adjacent stator poles is θ, and the magnetic field strength is R, the reference values A and B of the induction currents in the two coils can be calculated with the equations (3) and (4). Therefore, with the same principles of the disclosure, the AC motor or the AC motor generator can be used to generate power more efficiently.

In summary, the driving method of the disclosure can reduce or eliminate the invalid magnetic flux generated in the conventional multiphase motors. It is low cost, easy to implement, and saves power. When the method of the disclosure is used in two-phase AC motors in which the stator pole number is no longer limited to four or the stator pole pitch is smaller than 90 degrees, no magnetic field ripples are generated, and lesser power is required than a conventional three-phase sine-wave driven motor. So, the method of the present disclosure can expand the applications of two-phase motors. It is also possible to replace the three-phase motors in a cost effective way. When the method of the disclosure is used in an AC motor generator to generate power, the magnetic flux can be used more efficiently and the generator efficiency is improved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for driving an AC motor with alternating currents, wherein a controller uses software or hardware or software/hardware techniques to generate at least two alternating currents with different phases to drive the AC motor, the AC motor has a rotor, a stator and at least two sets of stator coils, the stator generates a plurality of stator poles when the stator coils are energized, the angular distance between two adjacent stator poles is smaller than 90 degrees, the method comprising:

driving the two sets of stator coils with the two alternating currents to generate two sets of magnetic fields which combine into one set of magnetic field sum so as to drive the rotor, wherein the magnetic field sum substantially has no ripples and its change rate of rotation angle or movement is proportional to the change rate of the phase angle of the two alternating currents, wherein each cycle of each of the two alternating currents has a positive half cycle and a negative half cycle, the positive half cycle comprises a positive curved-triangle current waveform, and the negative half cycle comprises a negative curved-triangle current waveform, wherein said positive or negative curved-triangle current waveform represents a current waveform with its rising slope and falling slope fall between a sine-wave current waveform and a triangle-wave current waveform of the same peak point.

2. The method of claim 1, wherein each of said two alternating currents has a reference current value A and B respectively, and the reference current value A and B are calculated by the following equations:

$$B = R \sin \alpha / \sin \theta,$$

$$A = R \cos \alpha - R \sin \alpha \cos \theta / \sin \theta,$$

wherein a represents an included angle between the magnetic field sum and a stator pole direction, θ represents an angular distance between two adjacent stator poles, and R represents the strength of the magnetic field sum, and θ is smaller than 90 degrees.

3. The method of claim 2, wherein a positive or negative reference current value of the two alternating currents with different phases at a specific time is calculated with the included angle α, the angular distance θ, and a required strength R of the magnetic field sum.

4. The method of claim 3, wherein the included angle a varies with time, θ and R are known values, and the controller uses real-time calculation or lookup tables or other software or hardware techniques based on the said equations to get the reference current values A and B of the two alternating currents respectively.

5. The method of claim 1, wherein when the controller generates a multiphase output of more than two phases, at any time only two phases of the multiphase output provides currents to the motor.

6. The method of claim 1, wherein the phase difference between the two alternating currents are 90 degrees.

7. A method for driving an AC motor with alternating currents, wherein a controller uses software or hardware or software/hardware techniques to generate at least two alternating currents with different phases to drive the AC motor, the AC motor has a rotor, a stator and at least two sets of stator coils, the stator generates a plurality stator poles when the stator coils are energized, and the angular distance between two adjacent stator poles is smaller than 90 degrees, the method comprising:

driving the two sets of stator coils with the two alternating currents to generate two sets of magnetic fields which combine into one set of magnetic field sum so as to drive the rotor, wherein the magnetic field sum substantially has no ripples and its change rate of rotation angle or movement is proportional to the change rate of the phase angle of the two alternating currents, each of the two alternating currents has a reference current value A and B respectively, and the reference current values A and B are calculated by the following equations:

$$B = R \sin \alpha / \sin \theta,$$

$$A = R \cos \alpha - R \sin \alpha \cos \theta / \sin \theta,$$

wherein α represents an included angle between the magnetic field sum and a stator pole direction, θ represents the angular distance between two adjacent stator poles, R represents the strength of the magnetic field sum, and θ is smaller than 90 degrees.

8. The method of claim 7, wherein a positive or negative reference current value of the two alternating currents at a specific time is calculated with the included angle α, the angular distance θ, and the required strength R of the magnetic field sum.

9. The method of claim 8, wherein the angle α varies with time, θ and R are known values, the controller uses real-time calculation or lookup tables or other software or hardware techniques based on the said equations to get the reference current values A and B of the two alternating currents respectively.

10. A method for generating electric power with an AC motor generator, wherein the AC motor generator comprises a rotor, a stator and two sets of stator coils, the rotor generates at least one set of rotating magnetic fields when the rotor rotates, and each set of the rotating magnetic fields drives the two sets of the stator coils, and generates two phases of induction currents with 90 degrees of phase difference in the two sets of stator coils, the angular distance between two adjacent stator poles is less than 90 degrees, wherein at any time point, α is an included angle between each set of the rotating magnetic fields and a stator pole direction, θ is the angular distance between two adjacent stator poles, and R is the strength of a rotating magnetic field, each of the two induction currents has a reference current value A and B respectively, and reference current values A and B are calculated by the following the equations:

$$B = R \sin \alpha / \sin \theta,$$

$$A = R \cos \alpha - R \sin \alpha \cos \theta / \sin \theta,$$

wherein θ is smaller than 90 degrees, α varies with time, and θ and R are known values.

* * * * *